United States Patent [19]

Halvorsen

[11] Patent Number: 5,278,804
[45] Date of Patent: Jan. 11, 1994

[54] DEVICE FOR WEIGHTING OF STREAMER CABLES

[75] Inventor: Aage Halvorsen, League City, Tex.
[73] Assignee: Geco A.S., Stavanger, Norway
[21] Appl. No.: 806,340
[22] Filed: Dec. 13, 1991

[30] Foreign Application Priority Data

Dec. 19, 1990 [NO] Norway ................. 905497

[51] Int. Cl.⁵ .................................................. G01V 1/38
[52] U.S. Cl. .......................................... 367/18; 367/16; 405/171
[58] Field of Search ...................... 367/16-18, 154; 405/171, 172

[56] References Cited

U.S. PATENT DOCUMENTS

| | | | |
|---|---|---|---|
| 2,570,707 | 8/1948 | Parr, Jr. ................. | 367/16 |
| 2,614,165 | 10/1952 | Doolittle ................. | 367/16 |
| 2,652,550 | 9/1953 | Lash ...................... | 367/16 |
| 2,791,019 | 5/1957 | DuLaney ................ | 405/172 |
| 3,240,512 | 3/1966 | Pennington et al. ..... | 405/172 |
| 3,287,691 | 11/1966 | Savit ...................... | 367/16 |
| 4,086,561 | 4/1978 | Wooddy, Jr. ........... | 367/154 |
| 4,953,146 | 8/1990 | McMurry ............... | 367/191 |

FOREIGN PATENT DOCUMENTS 136866 7/1973 Norway .
136007 4/1974 Norway .

Primary Examiner—Ian J. Lobo
Attorney, Agent, or Firm—Jacobson, Price, Holman & Stern

[57] ABSTRACT

For the balancing of seismic streamer cables (1) circular ring or sleeve-shaped weighted bodies are adjustably attached at desired intervals on the cable. The weighted bodies can be resilient for temporarily enlarging an opening (3) to receive the cable therethrough and for closing onto the cable in use, or can be circular cross-sectional bodies formed by two parts (4, 5, 4', 5') partially connected together by a single pin (6, 6') and fastened together by a spring pin (7) or hook-shaped pivoted lever (8) engageable with a retainer pin (10).

21 Claims, 1 Drawing Sheet

DEVICE FOR WEIGHTING OF STREAMER CABLES

BACKGROUND OF THE INVENTION

The invention concerns a device for weighting of streamer cables.

During seismic surveys at sea a seismic vessel tows behind it an array of seismic energy sources which transmit seismic signals, and recording equipment for these signals in the form of hydrophones which are arranged in a so-called streamer or streamer cable. This streamer cable, which contains a row of hydrophones, should be kept at a determined depth in the water and should hold a course which is as rectilinear as possible, i.e. so that all the hydrophones are at more or less the same depth. For this purpose the cable must be balanced, in order to achieve the required balance between buoyancy and weight and the cable's depth position is determined by means of guiding wing devices called "birds", which are attached to the cable at regular intervals.

To date, in order to balance streamers weights have been fitted to the outside, and this weighting has consisted of lead pieces or lead plates which are taped to the cable manually. The positioning of these lead pieces has on the whole been based on a rough estimate and, in order to obtain the best possible adjustment of the cable, it has often been necessary to go out in a boat in order to tape on new weights or to move weights.

This method of balancing a streamer has a number of disadvantages. Firstly, the work of taping on the lead pieces is extremely time-consuming, while at the same time the tape dissolves or is destroyed by exposure to the water, causing weights to fall off, resulting in maintenance work and continual renewal of the tape. These materials are expensive, particularly tape of the required quality for use in seal water. Moreover, there is also a regular need to remove the weight, e.g. during transfer from one area to another. This involves a great deal of time-consuming and laborious effort for unwinding tape. It has to be unwound since cutting it off would be too risky as the flexible, soft streamer is easily damaged. The most serious disadvantage, however, is that loose tape or deformed tape generates severe noise and this noise has an extremely unfavourable effect on the recording equipment which is fitted inside the cable. This technical disadvantage combined with the major costs involved in constant renewal of the adhesion of the lead pieces has produced an obvious need for improvement in this stage of the process. In this connection it can also be mentioned that it can be a complicated process to tape on a piece of lead from a small boat in the water.

BRIEF SUMMARY OF THE INVENTION

The object of-the present invention, therefore, is to provide a weighting device specially designed for streamer cables, whereby the necessary balancing or adjustment of the cable in local conditions can be performed quickly and simply, and where the device will not cause significant or intrusive noise which will affect the seismic recording.

This object is achieved by the invention in a weighting device, which can be of various sizes and weights, and is clipped or hooked on to the cable at the required intervals, a task which is easy and quick to perform and also can be performed relatively easily from a small boat which is sent out to carry out a final adjustment of a streamer. The device in accordance with the invention will retain its shape and it has been shown that with the construction possibilities this offers, the noise problems due to weighting are avoided to a considerably greater extent than previously.

Even though the device in accordance with the invention will be initially more expensive than the conventional lead pieces, it has proved to be a considerably more economical method since the device in accordance with the invention will be able to be used over a considerable period of time and will generate significantly less maintenance expenses. Another important advantage is that adjustments will be much simpler to perform since the weight can be moved to some extent and otherwise can be simply hooked on and taken off.

BRIEF DESCRIPTION OF THE DRAWINGS

The invention will be described in more detail with the aid of embodiments illustrated in the accompanying drawings wherein.

DETAILED DESCRIPTION

Figure 1:
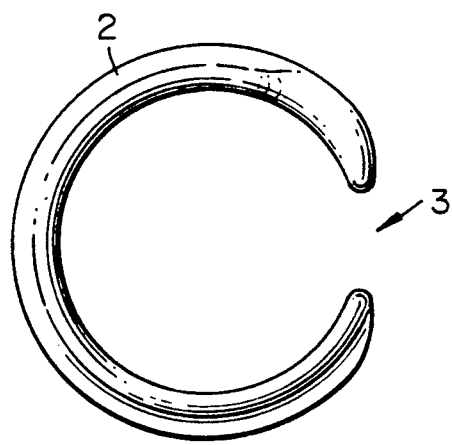
FIGS. 1 and 2 are an end elevational view and a side elevational view respectively of a first embodiment for the device in accordance with the invention.
Figure 2:
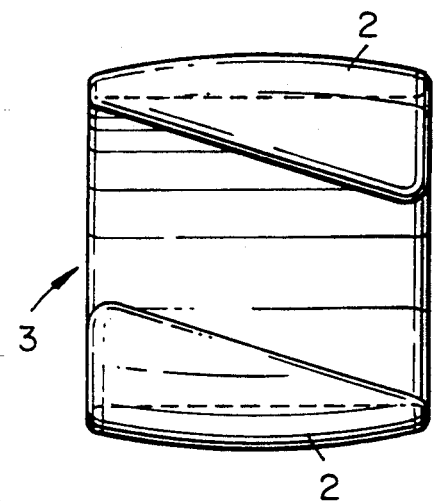
Figure 4:
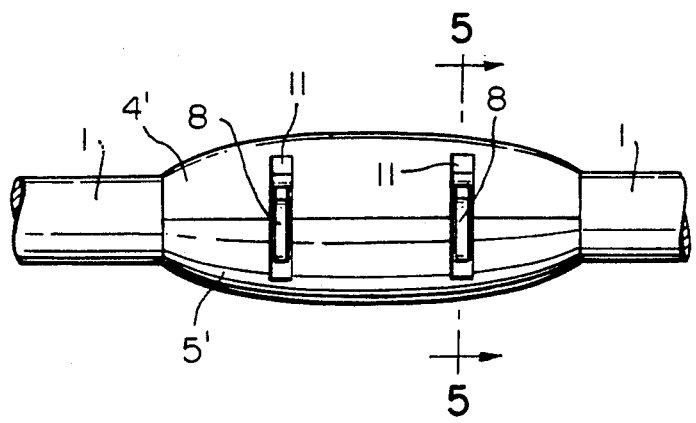
FIG. 4 is a side elevational view of third embodiment of the device in accordance with the invention.
Figure 5:
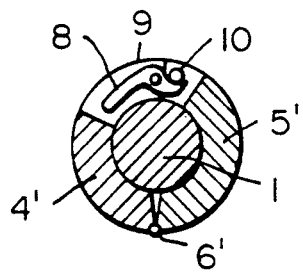
FIG. 5 is a cross-sectional view taken along line 5—5 of FIG. 4.

The streamer cable for which the weighting device is intended is not illustrated in the drawings, apart from FIGS. 4 and 5 where part of such a cable is shown by reference number 1. The cable is a flexible cable, connected by a plurality of cable lengths and conductors are threaded through the cable and at regular intervals hydrophones are fitted for reception of seismic signal reflections. The embodiment of the device in accordance with the invention which is illustrated in FIGS. 1 and 2 consists of a circular body 2 of relatively narrow width as illustrated in FIG. 1. On one side of circular body 2 is an opening 3 which has been cut at an angle as best illustrated in FIG. 2. The width of this opening is smaller than the width or diameter of the streamer which causes weight ring 2 to be pressed on to the streamer. Normally this could be done simply by squeezing the streamer, which is relatively soft, but it can be an advantage if the material of the ring 2 is rather springy, i.e. that the material of the body 2 is made of a material with a certain amount of elasticity, so that it can be expanded to temporarily increase the width of opening 3 and at least part of the diameter of the inner surface of the body to facilitate fitting it onto the streamer after which The inner surface and opening return to their normal conditions for attachment to the cable. An example of such a material is brass. Naturally a softer material can also be used, but then the ring will have to be clamped tightly around the streamer. The slanted insertion opening 3 has been given a shape which enables the ring also to turn with the opening upwards without falling off the streamer cable for this reason. It will be advantageous to fit such an element in the vicinity of the connection point on the streamer for the so-called "birds" and to position it in this area without it having to be attached in any other way.

Figure 3:
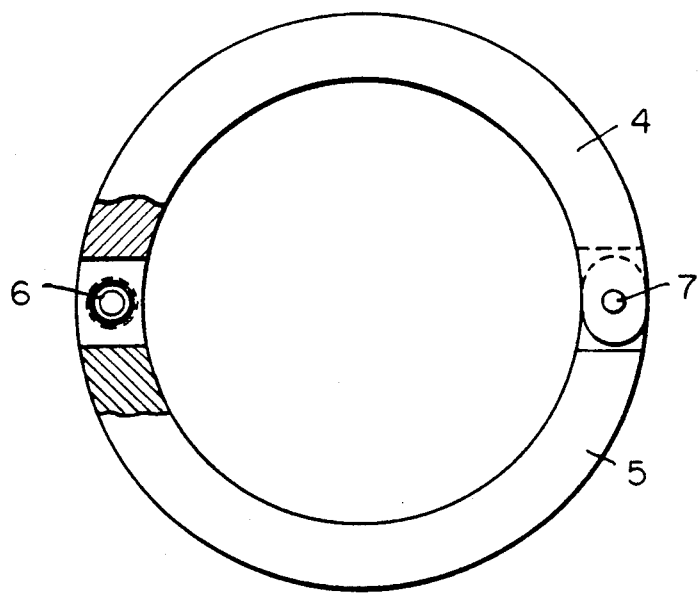
FIG. 3 is a section sketch of another embodiment for the invention.

FIG. 3 illustrates another embodiment, where the device in accordance the invention is composed of two parts 4 and 5 which are pivotally linked by a hinge 6 on one side. On the other side, in one part, e.g. 4, a spring-loaded peg 7 is fitted which protrudes, but which can be pressed in. The other half 5 of the device can be bevelled at the end, so that when it passes over peg 7 it will press it in, until peg 7 is in line with a hole in the end part of part 5 into which peg 7 is inserted, thus locking the parts firmly together around the streamer. If the weighting has to be removed or moved the peg must be pressed in to allow the parts to be released and the ring pulled off.

The device in accordance with the invention does not necessarily have to be circular in shape with a relatively narrow width, but the outer shape can also be constructed in a streamlined way in order to reduce noise as much as possible. It can thus also have a sleeve-shaped form. An example of such a construction is illustrated in FIG. 4, which shows a sleeveshaped body with rounded end parts. In this embodiment two parts 4' and 5 are connected by a pivot joint 6' for relative pivotal movement but in this case they are connected by means of a hook or hookshaped object which is fitted in milled grooves which are indicated by reference number 11. In each of these grooves 11 is fitted a lever 8 which revolves around a shaft 9 which is attached at one end section of part 4, while a pin or peg 10 is fitted at the adjacent end section of part 5. As illustrated in the section drawing of FIG. 4, a locking of the sections will be achieved by depressing the left part of the lever 8 causing its other end part to grip under the peg 10, thereby causing locking. Given appropriate dimensions, this locking, i.e. this lock position can quite simply constitute the only locking, but if desired blocking devices can also be installed in order to ensure that the parts remain locked. When it is opened, the left part of the arm 8 is pulled outwardly, so that it is raised, thus releasing the parts from each other.

Many other modifications will be possible within the scope of the invention, in that the invention will be independent of the locking mechanism, whether the weighting device is composed of one, two or more parts and whether these are linked or hooked together in several places. A possible variant will also be two mutually loose parts which are connected by a kind of bayonet lock. The material in the device can also vary, even although metals such as brass are preferred at present. The invention is thus intended to cover all such variants.

I claim:

1. A weighting device for weighting a marine seismic streamer cable comprising:
   a body comprised of a single unitary member having a substantially circular ring-shaped cross section with an internal surface having a diameter of a size relative to the outer diameter of said cable so that when installed on said cable said body grips at said internal surface onto said cable for attachment thereto; and
   an opening through one side of said body having a normal width when installed on said cable smaller than said outer diameter of said cable and through which said cable passes for attaching said body on said cable, said body being made of at least slightly elastic material so that said opening and said internal surface diameter are expandable for receiving said cable during installation of said body.

2. The device as claimed in claim 1 wherein:
   said body has an axial direction extending perpendicular to said ring-shaped cross section; and
   said opening comprises a slot extending at an angle relative to said axial direction of said body.

3. The device as claimed in claim 1 wherein:
   said body is made of a resilient metal material.

4. The device as claimed in claim 3 wherein:
   said metal is brass.

5. The device as claimed in claim 4 wherein:
   said body comprises an elongated sleeve shaped member having rounded ends.

6. The device as claimed in claim 3 wherein:
   said body comprises an elongated sleeve shaped member having rounded ends.

7. The device as claimed in claim 1 wherein:
   said unitary member comprises two part-circular elements each having one end pivotally connected together and a second end, said second ends together forming said opening; and
   releasable connecting means for releasably connecting said second ends together when attached on said cable.

8. The device as claimed in claim 7 wherein said releasable connecting means comprises:
   a slanted camming surface on one of said second ends facing in overlapping relationship the other of said second ends;
   a hole in said one of said second ends; and
   a spring loaded peg mounted in said other of said second ends for movement between a protruding position protruding toward and engageable in said hole in said one of said second ends in a connecting position, and an oppositely directed retracted position, so that when said part-circular elements are pivoted relatively to each other toward said connecting position said peg slidingly engages said slanting surface for camming said peg toward said retracted position until said peg engages in said hole in said protruding position for connecting said second ends together.

9. The device as claimed in claim 8 wherein:
   said body comprises an elongated sleeve shaped member having rounded ends.

10. The device as claimed in claim 7 wherein said releasable connecting means comprises at least one connecting means comprising:
    a radial slot in each of said second ends;
    a locking pin in one of said second ends protruding transversely at least partly through the respective slot in a direction substantially parallel to said axial direction; and
    a locking lever pivotally mounted in said other of said second ends for pivotal movement in the respective slot between a locking position and a release position and having a handle end, a locking end, and a hook-shaped portion on said locking end protruding into said radial slot in said one of said second ends for releasable engagement with said locking pin for connecting said second ends together when said lever is in said locking position.

11. The device as claimed in claim 10 wherein:
    said body comprises an elongated sleeve shaped member having rounded ends.

12. The device as claimed in claim 11 wherein:
    said at least one connecting means comprises two connecting means in axially spaced relationship.

13. The device as claimed in claim 7 wherein:

said body comprises an elongated sleeve shaped member having rounded ends.

14. The device as claimed in claim 1 wherein:
said body comprises an elongated sleeve shaped member having rounded ends.

15. The device as claimed in claim 2 wherein:
said body comprises an elongated sleeve shaped member having rounded ends.

16. A weighting device for weighting a marine seismic streamer cable comprising:
a body comprised of a single unitary member having a substantially circular ring-shaped cross section with an internal surface having a diameter of a size relative to the outer diameter of said cable so that when installed on said cable said body grips at said internal surface onto said cable for attachment thereto;
an opening through one side of said body having a normal width when installed on said cable smaller than said outer diameter of said cable and through which said cable passes for attaching said body on said cable;
said unitary member comprises two part-circular elements each having one end pivotally connected together and a second end, said second ends together forming said opening; and
releasable connecting means for releasably connecting said second ends together when attached on said cable.
a slanted camming surface on one of said second ends facing in overlapping relationship the other of said second ends;
a hole in said one of said second ends; and
a spring loaded peg mounted in said other of said second ends for movement between a protruding position protruding toward and engageable in said hole in said one of said second ends in a connecting position, and an oppositely directed retracted position, so that when said part-circular elements are pivoted relatively to each other toward said connecting position said peg slidingly engages said slanting surface for camming said peg toward said retracted position until said peg engages in said hole in said protruding position for connecting said second ends together.

17. The device as claimed in claim 16 wherein:
said body comprises an elongated sleeve shaped member having rounded ends.

18. The device as claimed in claim 16 wherein:
said body is made of a resilient metal material.

19. A weighting device for weighting a marine seismic streamer cable comprising:
a body comprised of a single unitary member having a substantially circular ring-shaped cross section with an internal surface having a diameter of a size relative to the outer diameter of said cable so that when installed on said cable said body grips at said internal surface onto said cable for attachment thereto;
an opening through one side of said body having a normal width when installed on said cable smaller than said outer diameter of said cable and through which said cable passes for attaching said body on said cable;
said unitary member comprises two part-circular elements each having one end pivotally connected together and a second end, said second ends together forming said opening; and
at least one releasable connecting means for releasably connecting said second ends together when attached on said cable comprising,
a radial slot in each of said second ends;
a locking pin in one of said second ends protruding transversely at least partly through the respective radial slot in a direction substantially parallel to said axial direction; and
a locking lever pivotally mounted in said other of said second ends for pivotal movement in the respective slot between a locking position and a release position and having a handle end, a locking end, and a hook-shaped portion on said locking end protruding into said radial slot in said one of said second ends for releasable engagement with said locking pin for connecting said second ends together when said lever is in said locking position.

20. The device as claimed in claim 19 wherein:
said body comprises an elongated sleeve shaped member having rounded ends.

21. The device as claimed in claim 19 wherein:
said at least one connecting means comprises two connecting means in axially spaced relationship.

* * * * *